Patented Apr. 19, 1949

2,467,378

UNITED STATES PATENT OFFICE 2,467,378

STABILIZATION OF MONOMERIC 1,1-DI-CYANO ETHYLENE

Harry Gilbert, Akron, Ohio, assignor to The B. F. Goodrich Company, New York, N. Y., a corporation of New York No Drawing. Application September 19, 1947, Serial No. 775,150

5 Claims. (Cl. 260—465.8)

This invention relates to stabilized monomeric 1,1-dicyano ethylene and relates more particularly to the use of oxides and sulfides of phosphorous for inhibiting the polymerization of monomeric 1,1-dicyano ethylene.

In copending applications Serial Nos. 775,149, filed September 12, 1947, and 785,520, filed November 12, 1947, methods for the preparation of 1,1-dicyano ethylene are disclosed. It is also disclosed in said copending applications, that 1,1-dicyano ethylene undergoes autopolymerization so that special precautions are necessary in order to inhibit such autopolymerization and to obtain the 1,1-dicyano ethylene in monomeric form and to keep it in the monomeric form during periods of storage. Many of the most commonly used stabilizing substances, such as hydroquinone, copper, copper salts, tertiary butyl carbinol, phenyl-beta-naphthylamine and the like are unsatisfactory for inhibiting the polymerization of 1,1-dicyano ethylene.

I have now found, however, that the sulfides and oxides of phosphorous are excellent stabilizers for monomeric 1,1-dicyano ethylene. The preferred oxide and sulfide of phosphorous have the formula $P_2O_5$ and $P_2S_5$, that is, where the phosphorous has a valence of 5. However, the other sulfides and oxides of phosphorous, that is, those in which the phosphorous has a valence of 2, 3 and 4, are also excellent stabilizers for 1,1-dicyano ethylene and are included within the scope of this invention. Among such other oxides and sulfides are the following: phosphorous tri-oxide ($P_2O_3$ or $P_4O_6$); phosphorous tetra-oxide ($P_2O_4$); phosphorous di-sulfide ($P_3S_6$ or $PS_2$) and phosphorous tri-sulfide ($P_4S_6$ or $P_2S_3$). It is to be understood that the stabilizing effect of the above-listed compounds occurs regardless of the method of preparation of the 1,1-dicyano ethylene.

The oxides and sulfides of phosphorous may be present in any desired amount, although generally, and especially for phosphorous pentoxide and phosphorous pentasulfide, small amounts of approximately 0.01 to 5%, more preferably 0.1% to 2% based on the weight of the monomer, are sufficient to inhibit the polymerization of monomeric 1,1-dicyano ethylene for long periods of time.

The following example illustrates the use of the oxides and sulfides of phosphorous as stabilizers for 1,1-dicyano ethylene according to this invention:

Example I

Monomeric 1,1-dicyano ethylene containing 2% by weight of phosphorous pentoxide was stored in silica glass containers at a temperature of 20° C. The samples were observed daily until the 1,1-dicyano ethylene became unstable (i. e., darkens and polymerizes to a non-flowing material), which in this case required 55 days. A control sample of monomeric 1,1-dicyano polymerized to a solid material in only 17 hours at 20° C. and even when kept at temperatures as low as 10° C.

Example II

A second set of samples were prepared as in Example I, using 2% by weight of phosphorous pentasulfide as the stabilizing agent. The 1,1-dicyano ethylene remained in the stable form for a period of 55 days at 20° C.

The stabilized composition of 1,1-dicyano ethylene may also be stored in plastic, metal or other type container in addition to glass. Furthermore, it may be stored at elevated temperatures with but little decrease in the time the composition remains stable.

Also, the other oxides and sulfides of phosphorous mentioned hereinabove exhibit stabilizing effects on monomeric 1,1-dicyano ethylene which are in general equal to phosphorous pentoxide and phosphorous pentasulfide.

While certain preferred manners of performing the invention have been disclosed, it is not intended to limit the invention thereto, for numerous variations will be apparent to those skilled in the art and are included within the scope of the invention as defined in the appended claims.

I claim:

1. Monomeric 1,1-dicyano ethylene containing as a stabilizer a member of the class consisting of the oxides and sulfides of phosphorous.

2. Monomeric 1,1-dicyano ethylene containing an oxide of phosphorous as a stabilizer.

3. Monomeric 1,1-dicyano ethylene containing a sulfide of phosphorous as a stabilizer.

4. Monomeric 1,1-dicyano ethylene containing phosphorous pentoxide as a stabilizer.

5. Monomeric 1,1-dicyano ethylene containing phosphorous pentasulfide as a stabilizer.

HARRY GILBERT.

REFERENCES CITED

The following references are of record in the file of this patent:

UNITED STATES PATENTS

| Number | Name | Date |
| --- | --- | --- |
| 2,210,320 | Kautter et al. | Aug. 6, 1940 |
| 2,373,094 | Noland | Apr. 10, 1945 |
| 2,379,453 | Noland | July 3, 1945 |
| 2,389,607 | Britton et al. | Nov. 27, 1945 |

OTHER REFERENCES

Ostling, Chemical Abstracts, vol. 15, page 2829 (1921).

Van der Burg, Rec. Trav. Chim., vol. 41, page 23 (1922).

Ephraim, "Inorganic Chemistry" (edited by Thorne et al., 4th ed.), pages 710, 718, 719 (1947).